United States Patent [19]

Lin

[11] Patent Number: 4,794,600
[45] Date of Patent: Dec. 27, 1988

[54] APPARATUS FOR ERROR CORRECTION OF DIGITAL IMAGE DATA BY MEANS OF IMAGE REDUNDANCY

[75] Inventor: Shaw-Yueh Lin, Encinitas, Calif.

[73] Assignee: Eastman Kodak Company, Rochester, N.Y.

[21] Appl. No.: 94,622

[22] Filed: Sep. 9, 1987

[51] Int. Cl.$^4$ ............................................... G06F 11/00
[52] U.S. Cl. ......................................... 371/37; 371/30
[58] Field of Search ........................... 371/2, 31, 37, 30

[56] References Cited

U.S. PATENT DOCUMENTS 4,661,954  4/1987  Harding et al. ........................ 371/37

Primary Examiner—Jerry Smith
Assistant Examiner—Stephen M. Baker
Attorney, Agent, or Firm—Daniel Robbins

[57] ABSTRACT

Correction of PCM digital image data by encoding of the redundancy present in blocks of the data may be subject to faulty encoding for certain amounts of redundancy. This occurs at the boundaries where the data values change from 255–256, 127–128 and 63–64, because all the binary bits of the representation change at these values. The improved apparatus of the invention encodes the redundancy in blocks of data by assignment of check bits in terms of the data magnitudes, and does not rely on the PCM binary representation to express the redundancy. Upon decoding, the recovered data redundancy is compared to the redundancy represented by the received check bits, and its magnitude is used to determine the data in error. The value in error is replaced by the average of the data values in the same block.

6 Claims, 9 Drawing Sheets

| SI*,SO* ↓ | | | | |
|---|---|---|---|---|
| 1,1 | 0,0 | 0,1 | 1,0 | 1,1 |
| 1,0 | 0,1 | 0,0 | 1,1 | 1,0 |
| 0,1 | 1,0 | 1,1 | 0,0 | 0,1 |
| 0,0 | 1,1 | 1,0 | 0,1 | 0,0 |
| SIR,SOR → | 1,1 | 1,0 | 0,1 | 0,0 |

FIG. 4

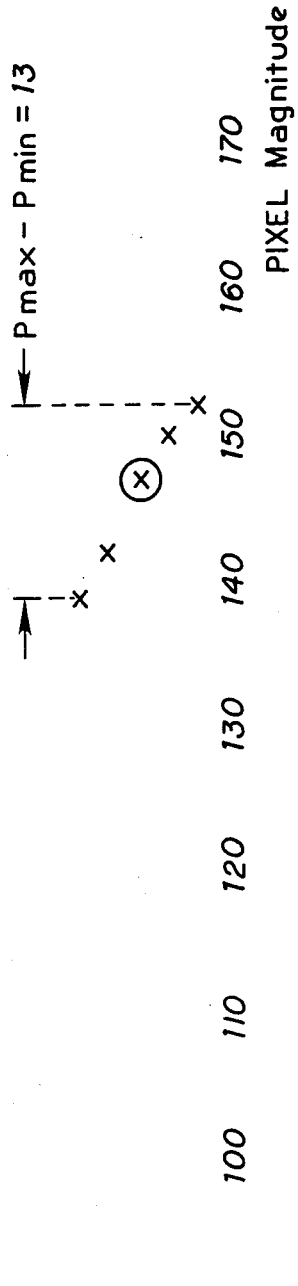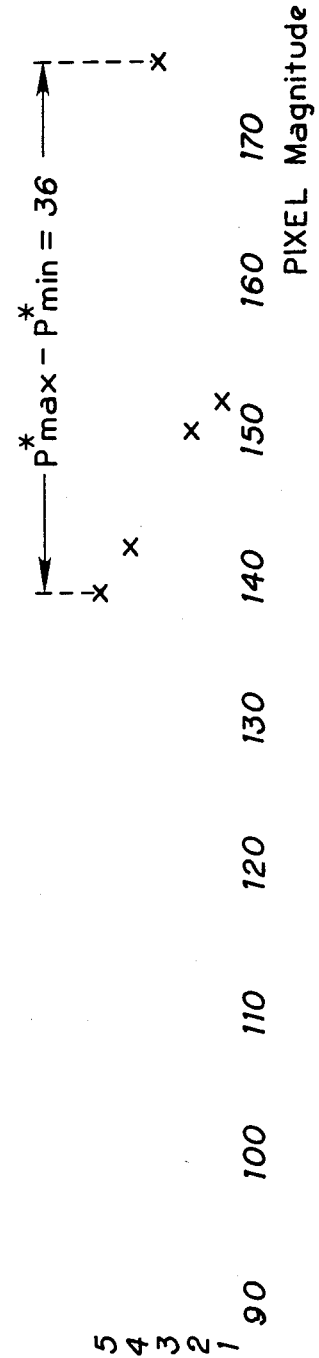

FIG. 6a 135
130
129
128
125

Pmax−Pmin=10
t1=15

FIG. 6b

| d min | | d max |
|---|---|---|
| | 135 | |
| | | 5 |
| | 130 | |
| 130 | | 6 |
| | 129 | |
| 129 | | 10 |
| | 125 | |
| 125 | | 0 |

P*max − P*min = 135

APPARATUS FOR ERROR CORRECTION OF DIGITAL IMAGE DATA BY MEANS OF IMAGE REDUNDANCY

BACKGROUND OF THE INVENTION

1. Field of the Invention

This invention relates to improved apparatus for error correction of digital data, and in particular to correction of digital data representing a pictorial image.

2. Description Relative to the Prior Art

While much digital data, such as that derived from computation and general data processing has no redundancy, data generated by digital processing of images is characterized by substantial amounts of redundant information. The established method of converting images into digital data entails projecting the image onto a sensor having an analog output, and then scanning the sensor and digitizing its output. The redundancy inherent in the image is carried over into the resultant digital data stream; the digital values themselves exhibiting the redundancy of the original pictorial image.

Referring to FIG. 1, a scene 10 is scanned in horizontal segments by an optical scanning device 12 whose output is a raster 14 containing the pictorial information in the form of electrical analog signals. The scanning device 12 may be any one of the optical scanners known in the art; for example, the laser scanner, kinescope scanner, or CCD sensor and associated scanning circuits. The electrical signals are then sequentially digitized by means of a sampling analog to digital converter 16 whose output is the digital representation of the image intensity on a line by line basis. Such image samples are conventionally referred to as "pixels". Generally, the digitizer 16 output comprises the pixel value expressed in binary form wherein eight bits per sample correspond to a 256 level gray scale of image intensity. A digital eight bit sample is usually designated as a "byte", however, a byte may be defined to contain any discrete number of bits. This binary coded representation of the digital values of the samples is called "pulse code modulation", or PCM. Usually the image is digitized to allow either electromagnetic transmission or magnetic recording of the PCM encoded samples.

In FIG. 1, the line 18 represents a left-to-right scan across the "sky" portion 19 of the scene 10, and it will be appreciated that the image intensity across such a scan will be essentially constant. Similarly, the intensity of the scan of the line 20 across the sky remains essentially constant until the edge of the "cloud" 22 is encountered, and then the image intensity changes to another essentially constant value for the duration of the scan across the "cloud". Upon completion of the scan of the cloud, the intensity and the sample values then revert to the values representative of the "sky" 19. Such scans result in sample values that are highly redundant because there is little detail in the portions of the scene being sampled. On the other hand, the detailed portions of the scene which consist of rapidly changing intensities result in samples of limited redundancy; during the scan 23 across the "tree" 25, rapidly varying sample values of intensity are generated. Thus, the data is characterized by non-redundant bytes derived from scans of detailed portions of the image such as the "tree" 25, and by redundant byte values derived from scans of the "sky" 19 or the "cloud" 22 where the intensity changes little, if at all.

The present inventor's copending application, Ser. No. 023,327, U.S. Pat. No. 4,761,782 focuses attention on the use of image redundancy for error correction after the transmission or storage of the digitized image data. Aberrations such as fading in an electro-magnetic transmission channel, or dropouts in a magnetic tape storage channel cause signal loss and upon recovery of the data, attendant errors. These errors result in easily discernible, detrimental streaking in the recovered image. The teaching of the above copending application ameliorates this problem by utilizing the available image redundancy as the basis for error correction in the recovered image data. It teaches the grouping of the digitized bytes representative of an image into data blocks whereby the redundant information present in the image becomes replicated in the data block and results in some of the bytes having essentially the same, or nearly the same, digital values as other bytes within the same block. Prior to transmission or storage, each block is analyzed for redundant sample values, i.e. values which are either identical or which only vary within predetermined boundaries, and check bits are accordingly affixed to the block. The configuration of the check bits defines the nature and the extent of the redundancy in the bytes comprising the block. The block containing data and check bits is then transmitted or stored. The recovered data, which has been subject to induced errors during transmission or storage, is analyzed to ascertain whether the bytes comprising the block still contain the same redundancy specified by the affixed check bits. If an error has occurred, the resultant redundancy of the received data will generally be reduced; at least one of the recovered pixels in the block will be different from what it originally was due to the error. The above mentioned copending application teaches re-encoding the received data to derive new check bits based on the received data which are then compared to the original check bits as received. This comparison generates a "syndrome" having the value "0" if the check bits derived from the received data are the same as the original check bits, and having the value "1" if the re-encoded check bits do not agree with the original check bits. A syndrome of value 1 flags an error and the fact that the data in the block has changed during transmission. As described in the copending application, if an error has occurred, the received data bytes are then compared among themselves to ascertain which data pattern is characteristic of the majority of received bytes. This majority pattern is assumed to be the correct pattern for all the bytes of the block including the bytes in error. The bytes in error are then corrected in accordance with the instructions inherent in the configuration of the original check bits. The correction restores the data patterns to their original configuration, and, attendantly, restores the amount of redundancy that was originally present in the block.

The check bits are not derived from the actual values of the data bits as is characteristic of many codes known in the art. The check bits reflect the fact that "patterns" of data bits within the block are the same, but the check bits do not explicitly define the structure of these patterns.

In considering the teaching of the prior art, it is advantageous to provide a listing of various check bit symbols used in describing the technique.

Sx=check bit x derived from data before transmission,

SxR = received value of check bit Sx after transmission

Sx* = re-encoded value of Sx derived from data as received after transmission

SCx = value of syndrome calculated from SxR and Sx*, where for m check bits x = 0,1,2 ... m−1.

A prior art embodiment employs a two bit check pattern, S1, S0, which is attached to each block of n pixels to provide an 8n+2 bit block. Check bits are assigned in accordance with the following rules:

TABLE I

| S1 | S0 | CONDITION |
|----|----|-----------|
| 1 | 1 | Three most significant bits of all n pixels form indentical patterns |
| 1 | 0 | Only the two most significant bits of all n pixels form identical patterns |
| 0 | 1 | Only the most significant bits of all n pixels are the same |
| 0 | 0 | None of the above |

The above assignment of check bits reflects the degree of redundancy carried by the three most significant bits of the n pixels comprising a block. For example, the check bits 1,1 indicate that the n pixels have the highest redundancy in their three most significant bits, i.e. the three most significant bit patterns for all n pixels are the same. On the other hand, the check bits 0,0 indicate that there is no redundancy among the most significant bits of the n pixels, i.e. all of the patterns are different. The intermediate cases of 1,0 and 0,1 reflect in-between conditions of redundancy.

It will be appreciated that the prior art technique depends upon the image redundancy as expressed in the three most significant binary bits of the pixel binary representation. Because of the structure of binary representation, it is possible that certain values of redundancy will fail to encode in a manner correctly representing the redundancy value. For example, a block may consist of digitized image values of 127, 128, 132, 129, 127. Encoded into an eight bit binary representation, these values are:

127 = 01111111
128 = 10000000
132 = 10000100
129 = 10000001
127 = 01111111.

While it is clear by consideration of the actual magnitudes of these pixels that the information is highly redundant, neither the three most significant bits of the binary values of the five pixels are the same, nor are the two most significant bits, nor are the most significant bits themselves, the same. Due solely to the structure of binary representation, these five pixels appear to be completely non-redundant rather than highly redundant. This occurs at the transition between the numbers 127 and 128 in binary representation because all the bits switch in value with the result that values just above the transition point and values just below it have no similarity in the high order bit positions. A similar "boundary" problem also occurs for pixels having digitized binary values in the region of 256, and 64. It will be appreciated that because of this characteristic large undetected errors may occur at these boundary points. For example, it is clear that if the most significant bit of the binary number 128 is subject to error and changes from 1 to 0, the resultant pixel value instead of being 128 is 0; a level change of 50 percent of full scale, (i.e. 256), that is not corrected in the prior art due to coding failure at the boundary.

An analysis of typical images containing redundancy shows that from 7 to 15 percent of blocks may fail to incorporate a block's true redundancy value when utilizing the techniques of the prior art. This is partially due to the redundancy characteristics of the image and partially due to the above described boundary problem. The mere occurrence of pixel values which straddle a boundary region is not sufficient in itself to cause errors in the reproduced image. It is necessary that a transmission error or, say, a magnetic tape storage dropout error simultaneously occur with the incidence of the pixel value in the boundary region. Because the joint probability of these two conditions occurring simultaneously is very small, acceptable error correction in many applications is provided by the technique of the prior art. For the processing of the highest quality images wherein the occurrence of any large pixel errors, even if rare, is unacceptable, additional correcting power is required. The present invention provides that power by completely eliminating the source of the errors due to the boundary problem.

SUMMARY OF THE INVENTION

The improvement effected by the present invention eliminates the aforementioned boundary problem and the attendant large magnitude pixel error problem occurring at the boundaries by encoding the image, not in terms of individual binary bits comprising the pixels, but in terms of the magnitudes of the pixels. By encoding the measure of redundancy in terms of magnitude alone, the specific characteristics inherent in the numerical binary representation are bypassed, and the boundary problem no longer arises.

The invention teaches determining the maximum spread in the magnitudes of the pixels comprising a block to be encoded; the pixels are sorted in terms of magnitude and check bits assigned based on the difference in magnitude between the highest and the lowest values. This difference is a measure of the redundancy in the block: a block having high redundancy exhibits a smaller difference than a block exhibiting less redundancy. After transmission or storage the recovered data is re-encoded following the original encoding rules and the redundancy of the recovered block is determined. If an error is detected due to decreased redundancy, the pixel in error is ascertained and a value is assigned to that pixel which is the average of the magnitudes of the remaining pixels in the block. This insures that the resultant spread among the pixels of the corrected block is within the spread of values originally present in the block, and the original redundancy is thereby effectively restored to the data.

It will be appreciated that the practice of the invention overcomes the limitations arising from the structure of the binary number system in the representation of digital image data, and the practice of the invention provides a solution to the problem of large pixel errors due to the boundary effects present in the prior art.

BRIEF DESCRIPTION OF THE DRAWINGS

The invention, as well as the prior art, is described with reference to the figures, of which:

FIG. 4 is a drawing of a matrix of check bit relationships useful in understanding the invention.

FIGS. 5a and 5b illustrates an example of decrease of data redundancy due to a pixel in error.

FIGS. 6a and 6b illustrates an example of the determination of the pixel in error according to the invention.

DETAILED DESCRIPTION OF THE INVENTION

In the present embodiment of the invention the most frequently occurring type of error, i.e. that affecting a single pixel in a block, is corrected. In this embodiment, a block is comprised of five pixels and two assigned check bits. In a given block, the magnitude of the pixel having the maximum magnitude is designated Pmax, and the magnitude of the pixel having the minimum magnitude is designated Pmin. Using the symbol designations previously described in connection with the prior art description, the assignment of check bits is in accord with the following rules:

TABLE II

Figure 1:
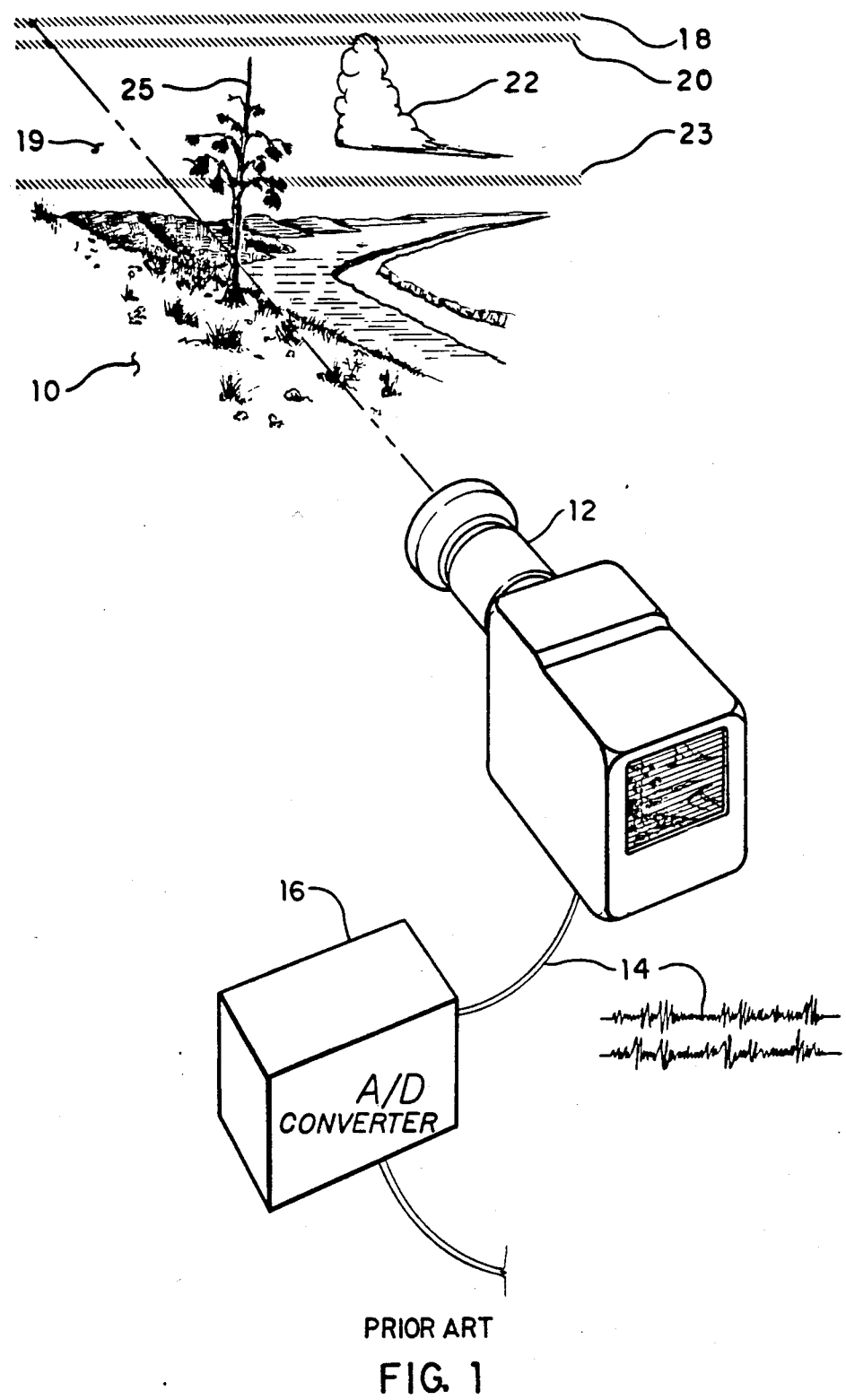
FIG. 1 is a drawing illustrative of the scanning of an image as practiced in the prior art.
Figure 2:
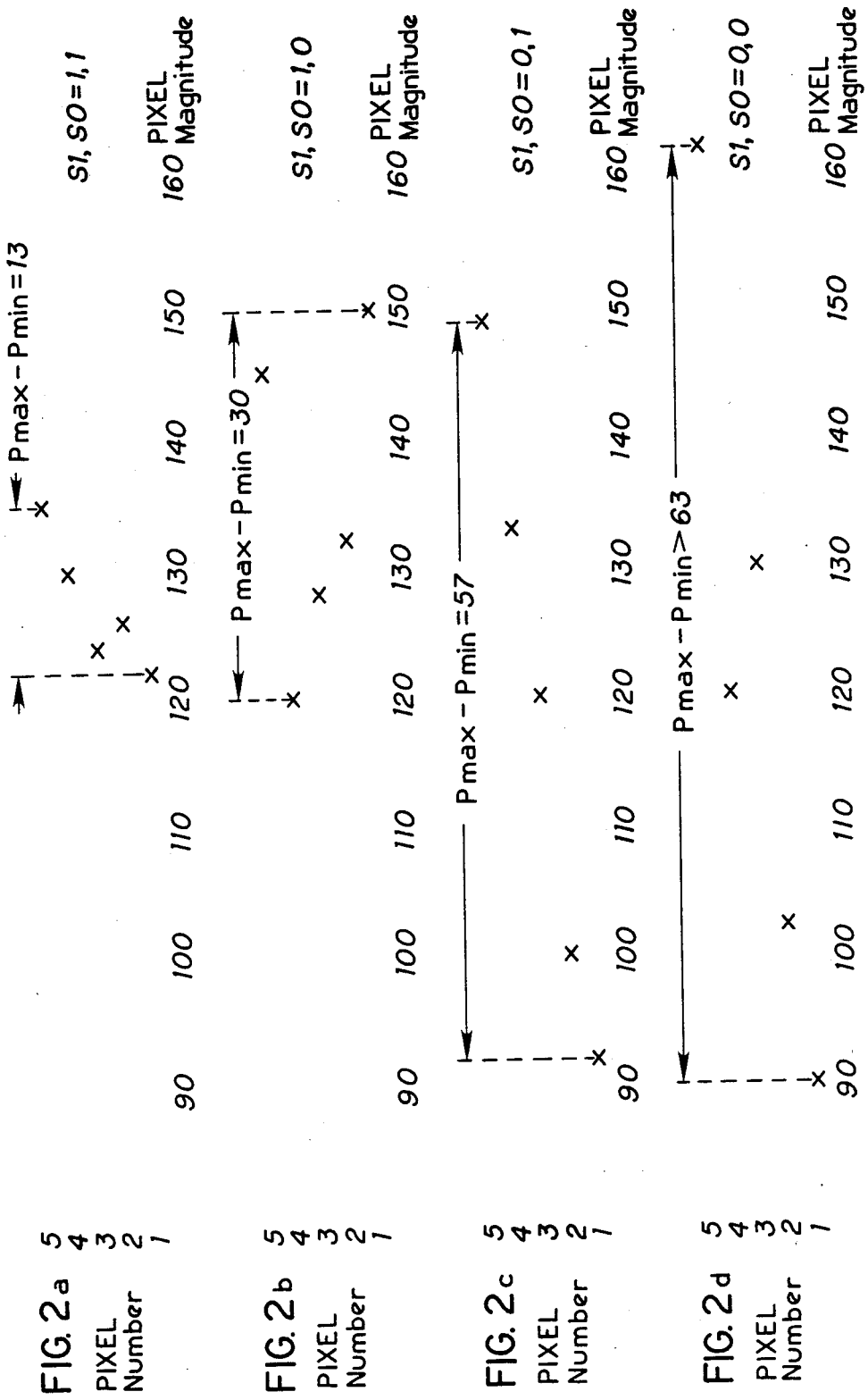
FIGS. 2a, 2b, 2c, 2d illustrate the assignment of check bits according to the teaching of the invention.

| S1 | S0 | CONDITION |
|---|---|---|
| 1 | 1 | Pmax − Pmin ≦ t1, |
| 1 | 0 | t1 < Pmax − Pmin ≦ t2, |
| 0 | 1 | t2 < Pmax − Pmin ≦ t3, |
| 0 | 0 | t3 < Pmax − Pmin | where t1, t2, and t3 are predetermined threshold values, and t1<t2<t3. Suitable threshold values, ti (i=1,2,3), which measure the relative amount of redundancy in a block, have been experimentally determined in the present embodiment, and the values t1=15, t2=31 and t3=63 have been found to provide satisfactory single pixel error correction. Referring to FIGS. 2a, 2b, 2c and 2d, examples of the distribution of pixel magnitudes leading to the assignment of check bit values are shown. In FIG. 2a, a block having pixels values of 122, 126, 124, 130, 135 is illustrated with a Pmax=135 and a Pmin=122 whereby Pmax-Pmin=13. This block's assigned check bits are S1=1, S0=1. In FIG. 2b the block pixel values are 150, 132, 128, 120, 145 with a Pmax of 150, a Pmin=120 and Pmax-Pmin=30; with check bits S1=1, S0=0. FIG. 2c illustrates pixels values of 92, 100, 120, 133, 149; Pmax=149, Pmin=92 and Pmax-Pmin=57 and S1=0 and S0=1, while FIG. 2d illustrates a block of pixel values whose range extends more than 63 units and therefore is assigned check bits S1=0, S0=0.

The relationship between the amounts of redundancy and the spread of pixel values is seen from inspection of FIGS. 2a–2d. The tighter the clustering of the pixel values, the greater the redundancy inherent in the pixel values. The pixels of FIG. 2a therefore represent a high degree of redundancy in the region of the image defined by the block, while there is considerably less redundancy in the region of the image characterized by FIG. 2d. FIGS. 2b and 2c represent intermediate amounts of redundancy.

Figure 3:
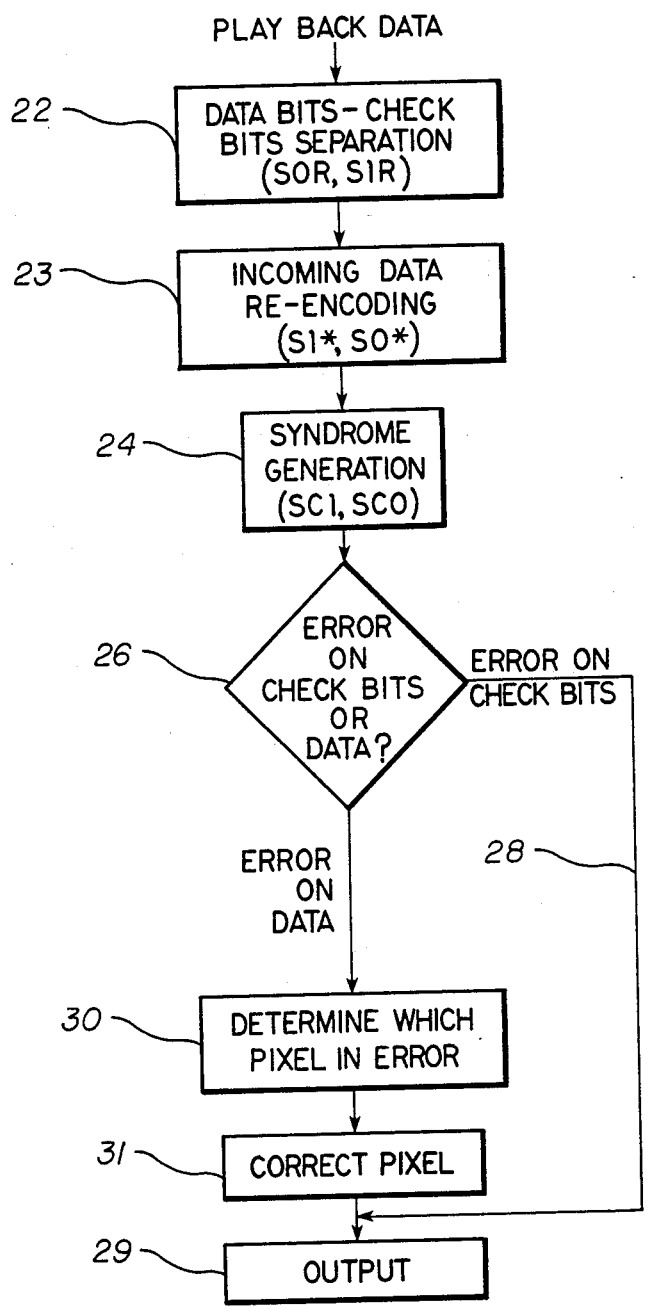
FIG. 3 is a flow diagram of steps in the correction of errors according to the invention.

After the determination of the values of the check bits, the check bits are merged with the data and the blocks are then transmitted or stored. After transmission or storage, wherein the data is subjected to error due to transmission or storage aberrations, the data blocks are recovered and decoded, and any single pixel error corrected in accordance with the decoding and error correcting algorithm shown in flow chart form in FIG. 3. Referring to FIG. 3, separation of the data bits and the check bits is performed in the step represented by a rectangle 22. The recovered data is then re-encoded, again using the above stated encoding rule, (rectangle 23) and the resultant check bits S1*, S0* are combined with the received check bits S1R, S0R to generate the syndrome SC1, SC0 of the received data block. This step is represented by rectangle 24, and consists of combining S1* with S1R and S0* with S0R by means of an "exclusive or" circuit. The resultant couple, SC1, SC0, has the possible values shown in the body of FIG. 4. It will be appreciated from inspection of the main diagonal of FIG. 4 that when both of the re-encoded check bits S1*, S0* agree with their corresponding received check bits S1R, S0R the syndrome SC1, SC0=0, 0. When the syndrome equals 0, 0 (decision box 26), the spread of the pixels in the received block is equal to or less than the spread of the pixels as originally encoded in the block; no significant error (i.e. one that changed the original redundancy condition) occurred during transmission or storage and no correction is required. The received data is then passed through to the output 29 as indicated by the path 28 of FIG. 3.

If the syndrome is not equal to 0,0, the received data patterns are not in agreement with the original data pattern as encoded by the original check bits, and an error has been detected. First, it should be observed that the assignment of check bit values in Table II has been organized such that the greater the redundancy in the block, the higher the digital value embodied in the check bits S1, S0 considered as a binary word of the form S1S0. For example, the first entry in Table I, S1=1, S0=1, considered as a binary word S1S0 equals the binary value 11, and represents the highest redundancy condition to be encoded. With this in mind, an inspection of the borders of FIG. 4, i.e. S1R, S0R and S1*, S0*, shows that for all entries above the diagonal the redundancy of the original data, as indicated by S1R, S0R, is less than the corresponding re-encoded data redundancy indicated by S1*, S0*. For example, if the received check bits S1R, S0R=0, 1 while the re-encoded check bits S1*, S0*=1, 1 the received data, when re-encoded, exhibits greater redundancy than the redundancy of the original encoded data as indicated by the received check bits S0R, S1R. The resultant syndrome SC1, SC0=1,0 is above the main diagonal of FIG. 4, which is always the condition when the re-encoded data indicates greater redundancy than the original data. It will be appreciated, however, that an indicated increase in recovered redundancy may occur either due to error in the data or error in the check bits. An analysis of actual image data encoded in 8 bit PCM code shows that it is more probable that an increase in recovered data redundancy after transmission is due to an error in the check bits rather than an error in the data. This occurs because it requires more bits in error among the n pixels of a block to cause increased redundancy than the 1 or 2 bit errors in the check bits needed to achieve the same result. Whenever, therefore, the entry in the syndrome table of FIG. 4 is above the diagonal as determined by decision box 27, errors in check bits and not in data are assumed, and the decoder simply passes the code block to the output, as in the case of the 0 syndrome, without attempting any correction on the data bits.

On the other hand, if the entry is below the diagonal, the opposite is true, and the recovered redundancy is now less than the original redundancy. The previously mentioned image analysis shows that it is now more likely that the data bits rather than the check bits are in error. For example, if after transmission or storage S1R, S0R=1, 0, i.e. the spread of the original encoded pixels is greater than 15 and less than 31, and the re-encoded check bits S1*, S0*=0,1, i.e. the spread of the re-encoded pixels is now greater than 31 and less than 63, the syndrome SC0, SC1=1,1 is below the diagonal and the recovered data exhibits less redundancy than that possessed by the original data. By following the teachings of the invention, the pixel in error in the recovered data is corrected to effectively restore the original redundancy in a manner to be described below. This is true for all entries whose syndromes fall below the main diagonal of FIG. 4.

The technique for error detection may be understood by considering the example of FIGS. 5a and 5b. In FIG. 5a the magnitudes of the pixels in a block before transmission or storage is shown; these pixels having the values 152, 150, 147, 142, 139. The spread between Pmax and Pmin for this block is 13, with a resultant t1=15, and assigned check bits S0, S1=1,1. During transmission or storage one of the pixels, say pixel 3 (circled) is subjected to an error causing its magnitude to change from the value 147 to 175. (After re-sorting the recovered pixels by magnitude, the value of the recovered maximum pixel is designated as P*max and the value of the recovered minimum pixel is designated as P*min. Similarly, the value of ti related to the re-encoded pixels is designated as t*i). On re-encoding P*max is now equal to 175 while P*min is now 36 and following the encoding rule P*max-P*min is greater than 31 and less than 63, with t*i=t2 and S1*, S0*=0,1. The resultant syndrome SC1, SC0=1,0 and the entry is below the diagonal of FIG. 4 indicating that the recovered data redundancy is less than the originally encoded data.

As previously described, an error which decreases the redundancy is imputed to the data. FIG. 5b shows the recovered data, and it will be appreciated that for the case of a single pixel in error, when the recovered block has less redundancy than the original block, the pixel in error must be the pixel, which after recovery, is P*max or P*min. This is always true because the spread of the pixel values is determined only by the values of P*max and P*min. If the redundancy becomes less after transmission or storage, then the spread of values among the pixels in the block must have increased, and this can only occur if some one of the pixels has a new magnitude which is either greater than the original Pmax, or less than the original Pmin. Because only one pixel is assumed in error, then after re-encoding either the pixel whose magnitude is P*mas, or the one whose magnitude is P*min is the pixel in error.

To determine whether P*max or P*min is the value of the pixel in error, the invention teaches generating a series of differences, dmax, by sequentially subtracting all the remaining pixel values from P*max except P*min, and a second series, dmin, by sequentially subtracting all the remaining pixel values from P*min except P*max. The number of differences in the dmax sequence which have values greater than the original ti (which is derivable from the received check bit values S1R, S0R) is accumulated as Cmax. The number of differences in the sequence dmin which have values greater than the original ti is stored as Cmin. If Cmax>Cmin, the pixel in error is that having the value P*max, if Cmin>Cmax the pixel in error is that having the value P*min.

The error is corrected by calculating the average of the remaining pixels in the block and replacing the pixel in error by this averaged value. Because all the pixels except the one pixel in error lay within the spread pertaining to the original redundancy of the block, it will be appreciated that this method of error correction essentially restores the original redundancy to the block, because the pixel in error originally was included within the spread specified by the ti, and its new position can therefore be no more than ti/2 units away from its original position.

This correction method may be understood by referring to FIGS. 6a and 6b. This is the example previously considered of the occurrence of a large error when a pixel of value 128 changes so that in the received data its value is 0. Assuming the block consisted of the pixel values 125, 135, 129, 130, 128 before transmission, FIG. 6a shows the pixel values sorted by magnitude before transmission with Pmax-Pmin=135−125=10. The corresponding ti value is t1=15 for this highly redundant block of data. After transmission and the attendant error where the pixel changes from a value of 128 to 0, the pixels are re-sorted by magnitude as shown in FIG. 7b. P*max-P*min=135−0=135 indicating an error because the value of t*i is now greater than 15. (It will be recalled that the original spread in data specified by ti is recovered from the received check bits S1R, S0R). FIG. 6b also shows the dmax and dmin differences of the recovered data, and it will be appreciated that Cmax=0 because the three entries under dmax are each less than t1=15, while Cmin=3 because the number of entries under dmin greater than t1=15, is equal to 3. The minimum valued pixel is therefore the pixel in error in accordance with the rule stated above.

With the minimum valued pixel identified as being in error, the average value of the remaining pixels is calculated. For the present example, these pixels values are 135, 129, 130, 125, with an average value of 130. The pixel in error, i.e. the pixel having the value of 0, is assigned the value of the average, i.e., 130. The corrected pixel values are therefore, 135, 130, 129, 130 and 125, effectively restoring the redundancy of the original block and eliminating the large error which occurred during transmission.

Figure 7:
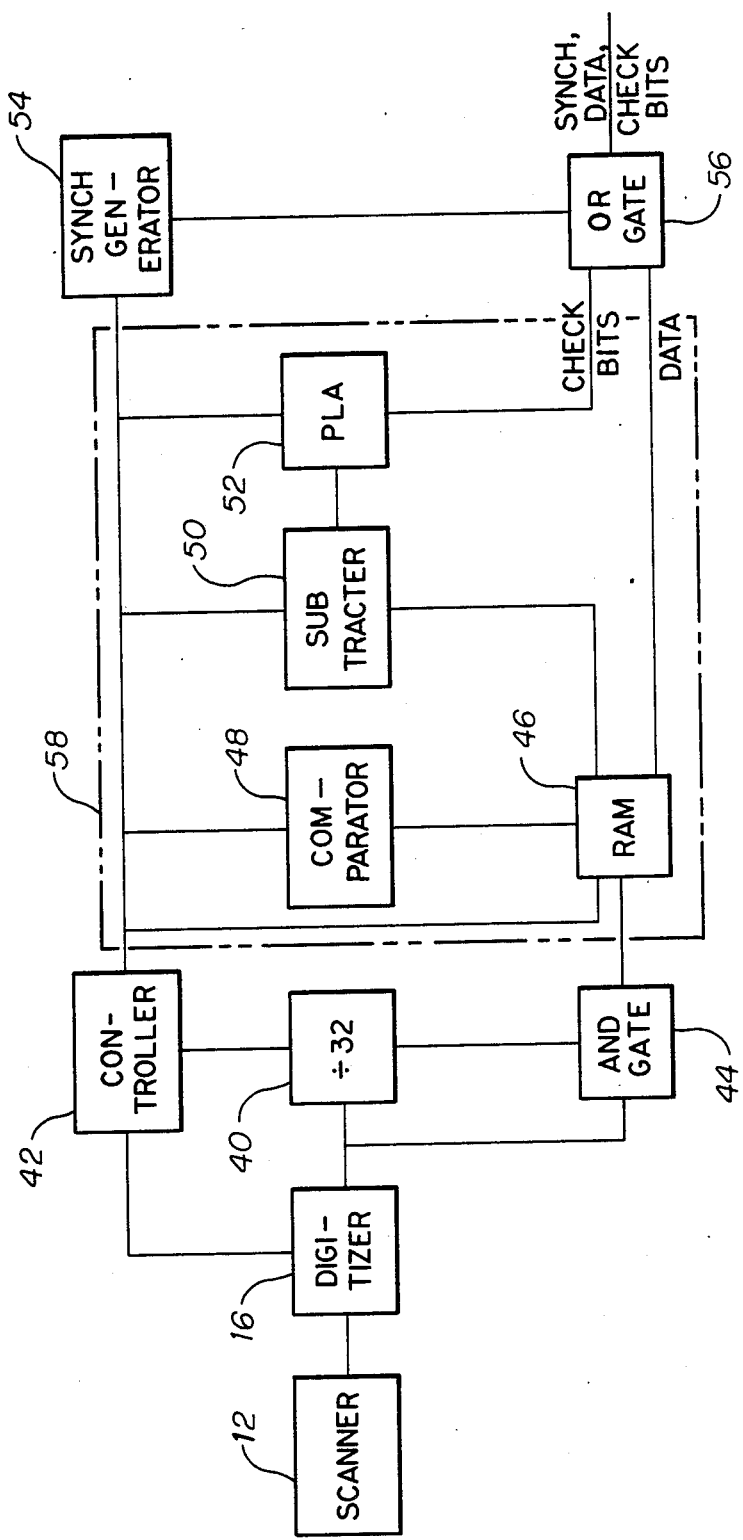
FIGS. 7, 8, and 9 are functional block diagrams of one embodiment of the invention.
Figure 8:
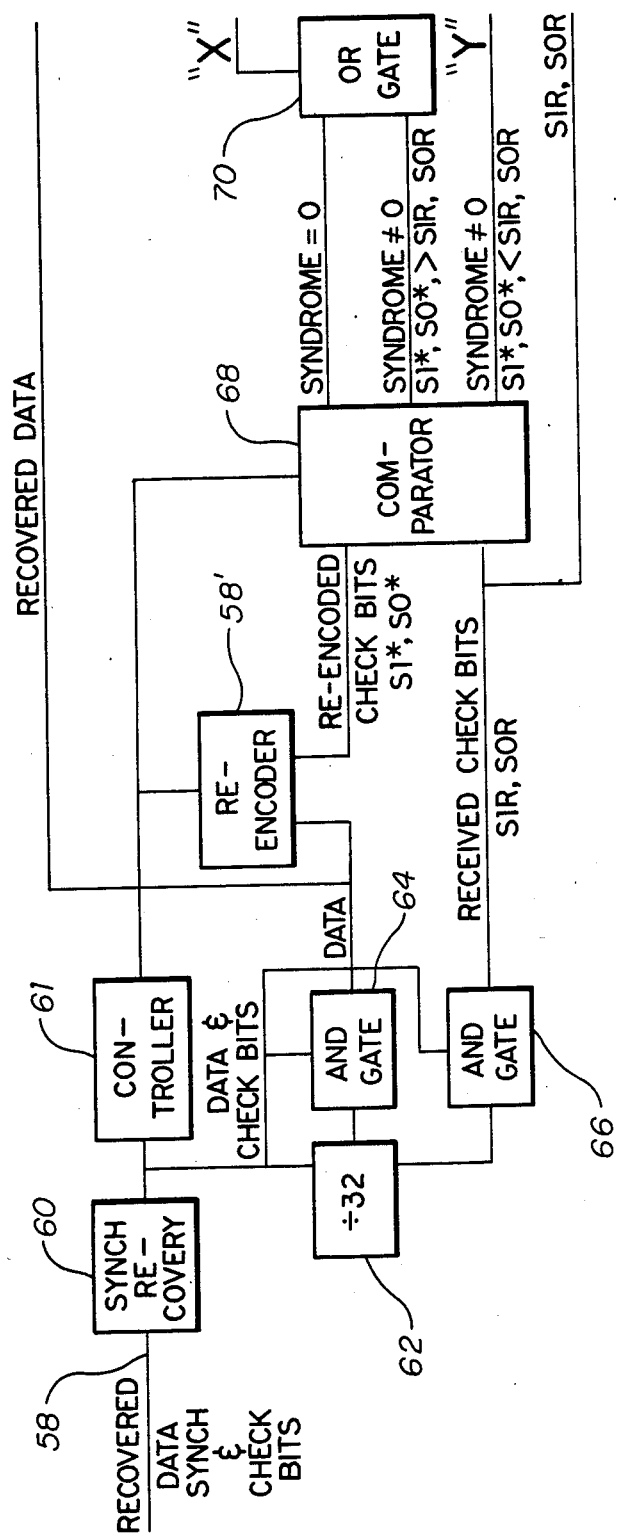
Figure 9:
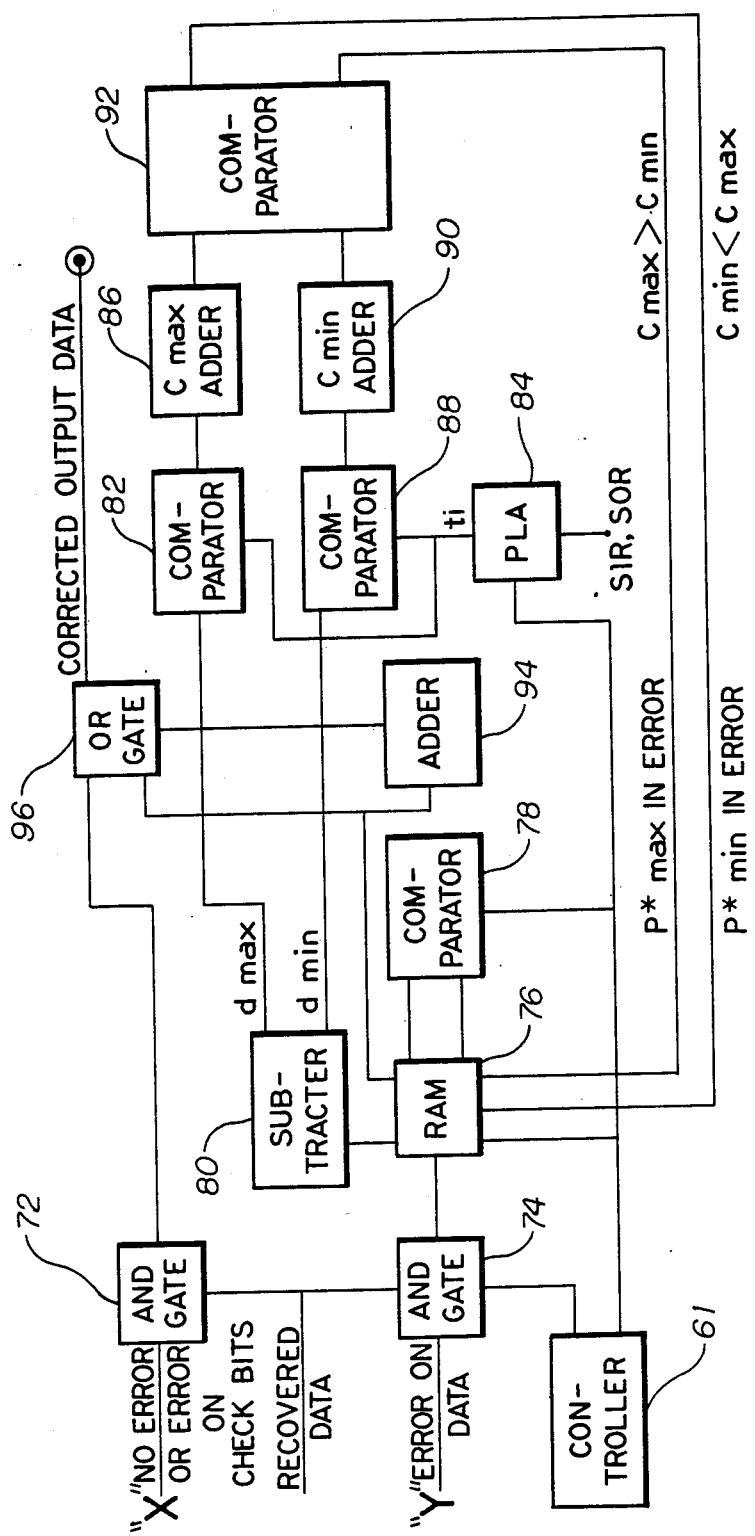

The operation of the improved apparatus of the invention may be understood by considering FIGS. 7–9. Referring to FIG. 7, the scanner 12 feeds the digitizer 16 whose output, under the control of a controller 42, goes both to a counter 40 which counts down the digitized data by a factor of 32 to generate a block signal, and to an AND gate 44. The block signal input to the AND gate 44 gates the digitized pixel values to a RAM memory 46 where the digitized data is stored one block at a time. The RAM memory is built up from register files such as the SN74170 4-by-4 register file chip manufactured by Texas Instrument Co., Dallas, Tex. After a block is stored, the controller 42 transfers the first two pixels of the block from the RAM 46 to a comparator 48 and the pixel values are compared and re-stored in RAM 46 in sequence. The next two pixels of the block are then transferred by the controller 42 from the RAM 46 to the comparator 48 where they are compared and re-stored in RAM 46. The controller 42 then transfers the resultant two larger pixel values from the RAM 46 to the comparator 48 which comparison results in determination of the largest value of the pixels among the first four pixels of the block. The controller 42 then transfers the fifth pixel of the block to the comparator 48 and the largest value of the previous four pixels is compared to the fifth pixel. The larger of this comparison is the largest pixel of the block; i.e. Pmax. The two smaller pixel values of the first four pixels are similarly transferred and compared to determine the smallest valued pixel among the four pixels. The controller then transfers the fifth pixel to the comparator 48, and the fifth pixel is compared to the previously determined smallest valued pixel among the first four, determining the smallest value pixel among the five; i.e. Pmin. After Pmax and Pmin are determined, the controller 42 transfers Pmax and Pmin from the RAM 46 to a subtracter 50 which performs the operation Pmax-Pmin. A suitable building block for the subtracter is the Texas Instrument SN74LS385 Quadruple Serial Adder/Subtracter. The output of the subtracter 50 i.e. Pmax-Pmin feeds a programmed logic array which under control of the controller 42 generates the required check bits corresponding to the magnitude of Pmax-Pmin. The programmed logic array may be a AmPAL 16R8 available from Advance Micro Device, Inc., Sunnyvale, Calif. The output of the PAL 52 are the check bits programmed into the PAL in accordance with Table II supra. A synch generator 54, of the type known in the art for inserting synchronizing signals into a PCM data stream, provides synchronizing signals which are input to an OR gate 56 which is also fed by the check bit output of the PLA 52 and the block data from the RAM 46; the output of the OR gate 56 is the composite signal consisting of synch, check bits and data for transmission or storage.

Referring to FIG. 8 for the recovery of the information after transmission or storage, the recovered data stream is applied to input 58 which first feeds a synch recovery circuit 60, known in the art for use with a PCM data stream to separate the synch and the data. The synch recovery circuit also actuates a controller 61. After the synch information is removed, the data and check bit stream is applied to a count down circuit 62 which provides gates defining the recovered pixel blocks. One output of the circuit 62 feeds AND gate 64 and another output feeds AND gate 66. The output of the count down circuit 62 gates the data and check bit stream which feeds the other input to the gate 64, such that the data is gated out and applied to a re-encoder 58' under control of the controller 61. The other output of the count down circuit 62 gates the check bits into a comparator 68. The re-encoder 58' contains the identical circuits included within the dashed lines of FIG. 7, and the recovered data applied to the input of re-encoder 58' is re-encoded in exactly the same manner as previously explained in connection with FIG. 7 for encoding the original data. The re-encoded check bits S1* and S0* are derived in this operation, and they are fed to a second input of a comparator 68. The comparator 68 has three outputs: one output if S1*,S0*=S1R,S0R i.e. the syndrome =0, a second output if S1*,S0*>S1R,S0R, and a third output if S1*,S0*<S1R,S0R. It will be recalled that if the syndrome=0 or if S1*,S0*>S1R,S0R, then no correction is performed on the data. To implement this, the first and second outputs of the comparator 68 are combined by means of an OR gate 70 to provide a control signal "X". The third output of the comparator is a control signal "Y".

Referring to FIG. 9, the "X" and "Y" signals are applied to inputs of AND gate 72 and And gate 74; the other inputs to these gates being the recovered data stream. If the "Y" signal is active, the AND gate 74 passes the data to a RAM where it is stored on a block by block basis under the control of controller 61. The data is transferred from the RAM 76 to a comparator 78 where it is sorted in magnitude to determine P*max and P*min as previously explained in connection with the corresponding sorting operation described in FIG. 7. The controller 61 then transfers Pmax to a subtracter 80 and sequentially subtracts from it the other pixel values in the block, except for the value of Pmin. This generates the sequence labelled dmax which is applied to one input of a comparator 82. The other input to the comparator 82 comes from a programmed logic array PLA 84 which generates the value of ti corresponding to the received check bits S1R,S0R. For each element of the sequence dmax greater than ti an adder 86 is incremented by 1, so that the accumulated total in the adder 86 is the number of entries in the sequence dmax greater than ti. The equivalent sequence of events occurs whereby the controller 61 transfers Pmin to the subtracter 80 and the other pixel values (except for Pmax) are subtracted from Pmin generating the sequence dmin. Similarly, the elements of dmin are compared to the value of ti in a comparator 88, and for each element of dmin greater than ti an adder 90 is incremented. The outputs of the adders are then compared in a comparator 92. If adder 86 output is greater, then P*max is the pixel in error; if adder 90 output is greater, then P*min is the pixel in error. The outputs of the comparator 92 flag the appropriate pixel in error in the RAM 76. The controller then transfers the values of the pixels stored in the RAM 76, except for the pixel in error, sequentially to an adder 94 wherein their sum is accumulated. Because there are four remaining pixels not in error, the average value of these pixels is the sum accumulated in the adder 94 divided by four. Division by four in binary is accomplished by moving the binary point two places to the left in the sum, and therefore the average value of the accumulated pixels in the adder 94 is obtained by ignoring the two low order output positions of the adder 94, and taking the output from the remaining output locations of the adder 94, with proper consideration of the location of the binary point. This output is the corrected value of the pixel in error and it is fed to an OR gate 96 where it is combined with the other pixels in the block which are transferred out of the RAM 76 by the controller 61. The blocks in which there were no errors are available at the output of the AND gate 72, and this output is also applied to the OR gate 96 so that the output of the gate 96 is the corrected data output signal.

The invention has been described in detail with particular reference to preferred embodiments thereof, but it will be understood that variations and modifications can be effected within the spirit and scope of the invention.

What is claimed is:

1. An improved apparatus for detection and correction of an error in digital samples of image pixels characterized by redundant information, said improved apparatus comprising:

(a) means for assembling said pixels into first data blocks comprised of first samples of said pixels, (b) means for determining the spread in values of said first samples in each of said first data blocks to provide a first measure of redundancy in each of said first data blocks, (c) means for recovering said first samples from each of said first data blocks, to provide second samples comprising second data blocks, (d) means for determining the spread in values of said second samples in each of said second data blocks to provide a second measure of redundancy in each of said second data blocks, (e) means for comparing said first measure of redundancy of each of said first data blocks with said second measure of redundancy of each corresponding block of said second data blocks, to provide an indication of a sample in error in a data block of said second data blocks, (f) means for determining said sample in error, in said data block containing said sample in error of said second data blocks, (g) means for determining the average value of the magnitudes of the samples not in error in said data block containing said sample in error, of said second data blocks, and (i) means for replacing said sample in error by said average value whereby said data block of said second data block has a measure of redundancy essentially equal to said first measure of redundancy of the corresponding data block of said first data blocks.

2. The apparatus of claim 1 wherein said samples of image data are represented by a binary code.

3. The apparatus of claim 1 wherein said first measure of redundancy is obtained by subtraction of the magnitude of the smallest sample in each of said first data blocks from the magnitude of the largest sample in the same block of said first data block.

4. The apparatus of claim 3 wherein said first measure of redundancy is represented by at least one binary check bit.

5. The apparatus of claim 1 wherein said second measure of redundancy is obtained by subtraction of the magnitude of the smallest sample in each of said second data blocks from the magnitude of the largest sample in the same block of said second data block.

6. The apparatus of claim 5 wherein said second measure of redundancy is represented by at least one binary check bit.

* * * * *